Jan. 17, 1967  G. E. FRANCK  3,298,528
STRAINER
Filed July 23, 1963
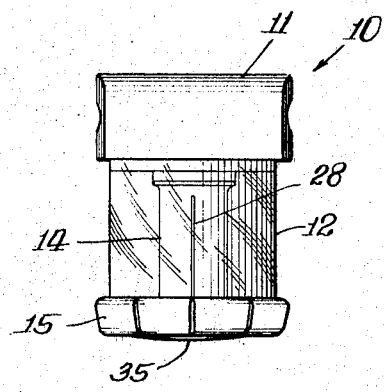
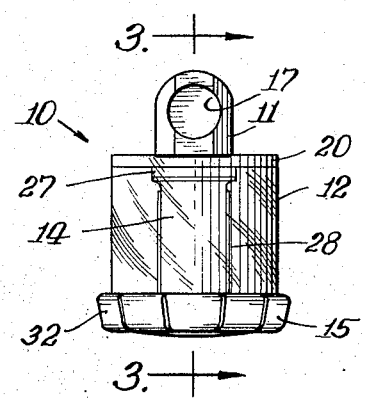
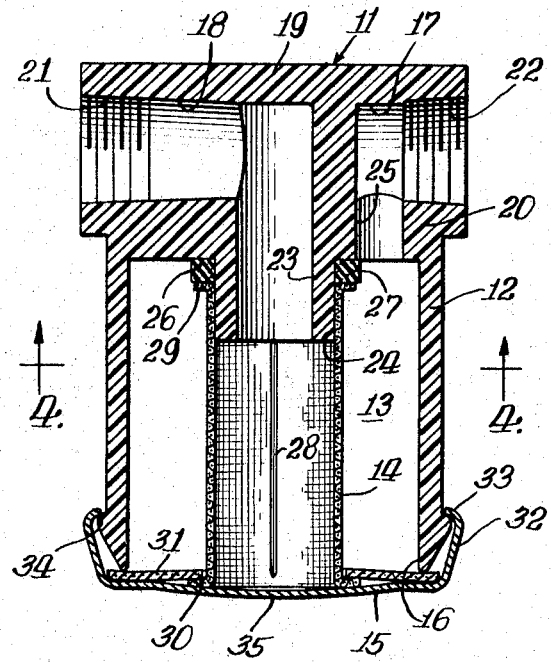
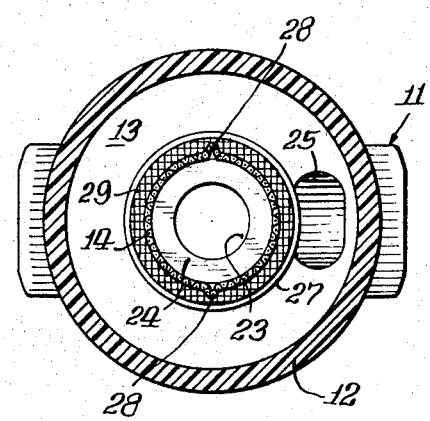
INVENTOR.
George E. Franck,

United States Patent Office 3,298,528
Patented Jan. 17, 1967

3,298,528
STRAINER
George E. Franck, Morton Grove, Ill., assignor to Imperial-Eastman Corporation, a corporation of Illinois
Filed July 23, 1963, Ser. No. 296,984
7 Claims. (Cl. 210—444)

This invention relates to fluid flow devices and in particular to devices for filtering or straining fluids.

In the use of certain fluids it is desirable to provide straining means in the fluid supply system closely adjacent to the apparatus utilizing the fluid so as to effectively assure the prevention of passage of foreign particles and the like to the apparatus. An example of one such apparatus is that of a gasoline engine wherein the presence of foreign particles in the gasoline within the engine may cause serious and costly damage. Thus, it is customary to provide in the fuel line leading to the engine a filter or strainer for effectively preventing the passage of such foreign material to the engine. The present invention comprehends an improved strainer providing such filtering functioning in a novel, simple and economical manner.

Thus, a principal feature of the present invention is the provision of a new and improved strainer.

Another feature of the invention is the provision of such a strainer having extremely simple and economical construction while yet providing effectively positive straining of the fluid passed therethrough.

A further feature of the invention is the provision of such a strainer arranged for simplified and facilitated assembly and disassembly thereby providing for facilitated maintenance.

Still another feature of the invention is the provision of such a strainer including a body member having an outer annular seat, an outlet passage having a first end portion arranged for connection thereto to a fluid receiver and a second end portion opening through the area bounded by the seat, and an inlet passage having a first end portion arranged for connection thereto to a fluid supply and a second end portion opening outwardly through said body member, means on the body member defining a straining chamber in communication with the second end portion of the passages and having an open portion spaced outwardly of the seat, a closure selectively removably closing the open portion of the chamber means, and a tubular resiliently axially contractible strainer element having a first end carried by the closure and an opposite, second end urged into sealed association with the seat by the closure when the closure is in place closing the open portion of the chamber means.

A further feature of the invention is the provision of such a strainer wherein the strainer element comprises a screen having an annular outturned flange at its opposite ends for facilitated connection to the closure and for improved sealed connection to the body member in the assembled relationship of the strainer.

A yet further feature of the invention is the provision of such a strainer having improved means for reinforcing the strainer screen.

Other features and advantages of the invention will be apparent from the following description taken in connection with the accompanying drawing wherein:

FIGURE 1 is a front elevation of a strainer embodying the invention;

FIGURE 2 is an end elevation thereof;

FIGURE 3 is an enlarged diametric section taken substantially along the line 3—3 of FIGURE 2; and FIGURE 4 is a transverse section taken substantially along the line 4—4 of FIGURE 3.

In the exemplary embodiment of the invention as disclosed in the drawing, a strainer generally designated 10 is shown to comprise a body member 11 including a tubular wall 12 defining a strainer chamber 13. A strainer member 14 is retained within the chamber 13 by means of a closure 15 extending across the open outer end 16 of the tubular wall 12. The body member 11 further defines an inlet passage 17 and an outlet passage 18 whereby fluid to be strained is admitted to the strainer through the inlet passage 17, passes through the strainer member 14 which strains foreign particles therefrom and thence passes through the outlet passage 18 for delivery as desired.

The body member 11 further includes a connecting portion 19 and a base portion 20. The tubular wall 12 extends outwardly from the base portion 20 so that chamber 13 is in communication with each of the passages 17 and 18 as best seen in FIGURE 3. Passage 18 may be provided with an outer threaded connecting portion 21, and passage 17 may be provided with a threaded outer portion 22 for connection thereto of a suitable inlet conduit (not shown). Passage 18 includes an inner portion 23 which extends through base portion 20 of the body member and an annular boss 24 projecting from the base portion 20 into chamber 13. Passage 17 includes an inner portion 25 extending through the base portion 20 and opening into chamber 13 adjacent the boss 24. The annular surface 26 of the base 20 circumjacent the boss 24 comprises a seat against which is urged a seal ring 27 in concentric surrounding relationship to the boss 24.

The strainer member 14 herein comprises a tubular element formed of a fine mesh screen of a suitable material such as metal. The screen is preferably slightly resilient whereby the tubular member is resiliently axially contractible. The screen may be reinforced, as by provision of suitable folds 28 extending parallel to the axis thereof, a pair of such folds being provided in the illustrated embodiment shown in FIGURE 4. As shown the folds 28 extend slightly less than the wall length of the strainer member 14.

The screen strainer member 14 is provided at its inner end with a radially outturned annular flange 29 which bears against the seal ring 27 concentrically surrounding the boss 24 as seen in FIGURE 3. The outer end of the strainer member 14 defines a radially outturned annular flange 30 which, as shown in FIGURE 3, is retained against the closure 15 by means of an annular gasket 31 facially juxtaposed to the inner surface of the closure. The closure comprises a cap-like member having a plurality of axially turned fingers 32 each terminating in an inturned flange 33 which latchingly engage an annular radially enlarged shoulder portion 34 defining the distal end of the wall 12. The midportion 35 of the closure 15 is suitably curved to provide a snap action drawing the fingers 32 radially inwardly to engage the shoulder portion 34 when the center portion 35 is in an outermost position as shown in FIGURE 3. When the midportion 35, however, is urged inwardly, or upwardly, from the arrangement of FIGURE 3, it causes the fingers 32 to turn radially outwardly and disengage the portions 33 from the shoulder 34 thereby permitting removal of the closure from the tubular wall 12 as desired. Alternatively, when the cap is placed across the open end 16 of the tubular wall 12 with the fingers in their outermost position, pressure on the closure 15 at the outer edge aligned with the fingers 32 causes the midportion 35 to snap downwardly to the position of FIGURE 3 and through the finger portions 33 into latched engagement with the shoulder portion 34 of the wall 12.

The length of the strainer member 14 is coordinated with the length of the tubular wall 12 so that when the closure 15 is installed as shown in FIGURE 3 the flange 29 bears against the sealing ring 27 to have sealed engagement therewith. In removing the closure 15 the axial resiliency of the strainer member 14 permits the closure portion 35 to be flexed inwardly sufficiently to effect the disengagement of the finger portions 33 from the shoulder 34 as discussed above. Further, the length of the fingers 32 is correlated with the dimensions of the shoulder portion 34 so that, when the fingers 32 engage the shoulder portion, the gasket 31 is clamped sealingly between the shoulder portion 34 and the closure 15 to preclude leakage of the fluid through the end 16 of the tubular wall 12.

In use the strainer 10 is installed in a fluid system by suitable connection of a supply conduit (not shown) to the inlet passage 17 and a delivery conduit apparatus (not shown) to the outlet passage 18. The fluid to be strained enters through the passage 17 and passes from the passage portion 25 to within the strainer chamber 13. Foreign particles are removed from the fluid as it passes through the strainer member 14. The strained fluid then passes outwardly through the outlet passage portion 27 and from the outlet passage 18. As the strainer member 14 provides a slight pressure drop between the fluid surrounding the member and that within the member, the strainer member is urged against the boss 24 and against the closure portion 35 and the gasket 31 is urged against the flange 30 to provide an improved sealed connection of the strainer member to the body member 11 and closure 15 respectively during straining use of the device.

When it is desired to remove the strainer member 14 such as for removing the collected foreign matter, the user merely presses on the central portion 35 of the closure to disengage the finger portions 33 from the shoulder portion 34 whereupon the assembled closure and strainer member may be axially withdrawn from the chamber 13. The foreign matter may then be removed from the screen as by washing and the assembly then reinstalled in the strainer by returning the assembly to the position of FIGURE 3 and pressing on the periphery of the enclosure adjacent the fingers 32 to snap the central portion 35 outwardly and cause the finger portions 33 to engage the shoulder 34.

The body member 11 may be simply and economically formed as by molding from a suitable plastic. If desired, the tubular wall portion 12 may be formed of a transparent plastic to permit visual examination of the strainer member 14 and observation of the fluid being filtered in the chamber 13. Thus, the strainer 10 is extremely simple and economical of construction and may be of minimum size while yet providing effectively positive straining of the fluid. The strainer further provides for extremely simple maintenance whereby continued efficient straining of the fluid may be readily maintained.

While I have shown and described one embodiment of my invention, it is to be understood that it is capable of many modifications. Changes, therefore, in the construction and arrangement may be made without departing from the spirit and scope of the invention as defined in the appended claims.

I claim:

1. In a strainer provided with a body member having an outer annular seat, an outlet passage having a first end portion arranged for connection thereto to a fluid receiver and a second end portion opening through the area bounded by said seat, and an inlet passage having a first end portion arranged for connection thereto to a fluid supply and a second end portion opening outwardly through said body member and means on the body member defining a strainer chamber in communication with said second end portion of said passages and having an open portion spaced outwardly of said seat, structure comprising: a flexible closure selectively removably closing said open portion of the chamber means; and a tubular resiliently axially contractible strainer element having a first end juxtaposed to said closure and an opposite, second end urged into sealed association with said seat by said closure when said closure is in place closing said open portion of the chamber means, said closure including means for gripping said strainer chamber means arranged to be disengaged from the chamber means as an incident of an urging of the closure inwardly to axially contract said strainer element.

2. The strainer structure of claim 1 further including sealing means carried by the closure for sealing the closure to said chamber means for sealingly closing said open portion and holding said first end in engagement with said closure to maintain association of the strainer with said closure.

3. The strainer of claim 2 wherein said first end of the strainer element comprises an annular radially outturned flange retained between said sealing means and said closure.

4. The strainer structure of claim 1 further including a seal ring overlying said seat portion, said second end of the strainer being urged into sealed association with said seal ring by said closure.

5. The strainer of claim 4 wherein said second end of the strainer element comprises an annular radially outturned flange.

6. The strainer of claim 4 wherein said body member includes an annular boss extending axially outwardly from said area bounded by the seat, and said second end of the strainer element coaxially engages said boss.

7. A strainer comprising: a body member having an outer annular seat, an outlet passage having a first end portion arranged for connection thereto to a fluid receiver and a second end portion opening through the area bounded by said seat, and an inlet passage having a first end portion arranged for connection thereto to a fluid supply and a second end portion opening outwardly through said body member; a seal ring overlying said seat portion; means on the body member defining a strainer chamber in communication with said second end portion of said passages and having an open portion spaced outwardly of said seat; a closure extending selectively removably across said open portion of the chamber means; sealing means carried by the closure for sealing the closure to said chamber means for sealingly closing said open portion; and a tubular resiliently axially contractible strainer element having a first end comprising an annular radially outturned flange held in association with said closure by said sealing means and further having an opposite, second end urged into sealed association with said seat by said closure when said closure is in place closing said open portion of the chamber means, said body member including an annular boss extending axially outwardly from said area bounded by the seat, said second end of the strainer element extending coaxially about said boss, and means for reinforcing the strainer element extending parallel to the axis of the strainer element and less than the length thereof.

References Cited by the Examiner

UNITED STATES PATENTS

| 1,668,071 | 5/1928 | Hart | 210—453 X |
| 2,153,664 | 4/1939 | Freedlander | 210—445 X |
| 2,529,827 | 11/1950 | Yarnell | 210—497 X |
| 2,661,966 | 12/1953 | Edelen | 210—453 X |

FOREIGN PATENTS

| 232,267 | 1/1961 | Australia. |
| 1,166,380 | 6/1958 | France. |

REUBEN FRIEDMAN, *Primary Examiner.*

D. M. RIESS, *Assistant Examiner.*